Aug. 27, 1968

G. REMMERS 3,399,000

HYDRODYNAMIC BEARINGS

Filed Sept. 27, 1966

INVENTOR.
GERRIT REMMERS
BY
*Frank R. Linfair*
AGENT

Aug. 27, 1968  G. REMMERS  3,399,000
HYDRODYNAMIC BEARINGS
Filed Sept. 27, 1966  3 Sheets-Sheet 2

INVENTOR.
GERRIT REMMERS
BY
AGENT

United States Patent Office 3,399,000
Patented Aug. 27, 1968

3,399,000
HYDRODYNAMIC BEARINGS
Gerrit Remmers, Emmasingel, Eindhoven, Netherlands, assignor to North American Philips Co., Inc., New York, N.Y., a corporation of Delaware
Filed Sept. 27, 1966, Ser. No. 582,315
Claims priority, application Netherlands, Oct. 5, 1965, 6512869
6 Claims. (Cl. 308—9)

The invention relates to a hydrodynamic bearing comprising a rotatable and a stationary bearing member, one of the cooperating supporting surfaces of the bearing being provided with a spiral groove pattern of small depth which, on rotation of the rotatable bearing member, urges lubricant from the entrance side to the exit side of the bearing gap.

Such bearings have a great bearing capacity and a very low frictional loss. For a favourable operation it is necessary that the spiral groove pattern always urges a sufficient amount of lubricant into the gap of the bearing so that at the entrance side of the spiral groove pattern lubricant must always be present. In case of comparatively high numbers of revolution of the rotatable bearing member and when using grease as a lubricant, the possibility exists, however, that as a result of the centrifugal force the lubricant does not reach the entrance side of the spiral groove pattern. To prevent a disturbance of the hydrodynamic operation, according to the invention the rotatable bearing member comprises a storage space for lubricant, said storage space being bounded by a wall of the stationary bearing member, transport grooves for the lubricant being provided in one of the surfaces of the stationary and the rotatable bearing facing one another on the side of the storage space facing the cooperating supporting surfaces of the bearing, said grooves having a transporting effect in the direction of the cooperating supporting surfaces and debouching in the proximity of the entrance side of the spiral groove pattern.

By providing the storage space in the rotatable bearing member the lubricant, on rotation of the shaft, is urged to the wall of the stationary bearing member as a result of the centrifugal force, where it comes within reach of the transport grooves. These grooves urge the medium to the entrance side of the spiral groove pattern so that said groove pattern is always provided with sufficient lubricant to ensure a hydrodynamic effect.

The hydrodynamic bearing according to the invention may advantageously be used in a bearing having a continuous shaft in which the rotatable and the stationary bearing member each comprise first supporting surfaces cooperating with one another and located at right angles to the centre line of the shaft for receiving axial forces and each comprising second supporting surfaces cooperating with one another and adjoining the first supporting surfaces for receiving radial forces. To obtain a very long operating period without replenishing with lubricant, according to the invention one of the cooperating first supporting surfaces is provided with a spiral groove pattern of small depth which has an urging effect in the direction of the centre line of the shaft and one of the cooperating second supporting surfaces comprises, at least at the end remote from the first supporting surface, a helical groove pattern which has an urging effect in the direction of the spiral groove pattern, the entrance side of the spiral groove pattern communicating with a place located near the end of the second supporting surfaces through at least one duct which is provided in the stationary bearing member, the transport grooves being provided in one of the cooperating supporting surfaces on one side of the storage space which is provided in the rotatable bearing member, a helical groove pattern being provided on the other side and serving as a seal for the lubricant to the exterior.

If the helical groove pattern is provided only at the end of one of the cooperating second supporting surfaces, the spiral bearing will pump the lubricant along the two sets of supporting surfaces. The medium is again returned to the entrance side of the bearing through the return duct. In this case the helical groove pattern serves as a seal between the ends of the supporting surfaces of the radial bearing. As a result of this substantially no loss of lubricant will occur. The transport grooves ensure that the closed lubrication system is kept under pressure and, if required, replenish lubricant from the storage space.

If one of the cooperating second supporting surfaces is provided, for example, with helical grooves throughout its length, only the end of these grooves serves as a seal; the remaining part urges the lubricant in the direction of the spiral groove pattern. In this case said grooves contribute to increasing the axial load to be received. The axial load to be received is largest if the urging effect of the helical grooves is larger than the urging effect of the spiral grooves. The closed lubricating system has an excellent operation since it is always filled entirely with lubricant. When using grease, no leakage will occur also when the bearing is not used. The bearing is suitable for high numbers of revolution, is free of sound vibration, has a favourable operation with small dimensions and, in addition, is comparatively cheap. Also as a result of the favourable operation of the storage space and the transport grooves, the operating period of the bearing can be extremely long without requiring any replenishment with lubricant.

In a structural favourable embodiment in which the rotatable bearing member is integral with the shaft, according to the invention the storage space for lubricant is provided between two ridges arranged at right angles to the shaft, one of the two supporting surfaces for receiving axial forces being formed by the surface of one of the ridges remote from the storage space, the helical groove patterns for transporting and sealing the medium being each arranged in one of the surfaces of the ridges facing one another and the stationary bearing member.

To facilitate the arrangement of the grooves and the storage space and to obtain a bearing which forms a separate unit which in proportions can correspond to a ball bearing, the rotatable bearing member in a further embodiment according to the invention consists of a sleeve which can be secured to a shaft and has an upright wall, the stationary bearing member consisting of an annular member the inner surface of which corresponds to the outer surface of the sleeve, the groove patterns being arranged in the surface of the sleeve and the storage space for the lubricant being located in the upright wall of the sleeve.

Providing the spiral groove pattern is greatly facilitated if, according to a further embodiment of the invention, it is provided, by means of an etching method, in a foil which with its side comprising no grooves is secured to one of the two supporting surfaces for receiving the axial load.

The invention may also advantageously be applied to a bearing the rotatable bearing member of which is secured to a shaft and has a conical supporting surface which, at least over part of its length, is provided with a spiral groove pattern, the stationary bearing member comprising a bore which is closed at the bottom and has a conical supporting surface. For a favourable operation of this bearing according to the invention the storage space for the lubricant is provided in the conical rotatable member and the spiral groove pattern extends on either side of the storage space, the part of the spiral groove pattern facing the shaft and serving as a seal having only a small length, a non-grooved conical part being arranged in the cooperating supporting surfaces between the shaft and the part of the spiral groove pattern serving as a seal. In this case the provision of the storage space is simplified and the part of the groove pattern operating as a seal need not be manufactured separately. When the shaft is stationary, the non-grooved cooperating conical parts of the bearing are forced against one another by a pretension thus forming a seal which is particularly effective when grease is used as the lubricant. This bearing also can be operated for an extremely long period of time without replenishing with lubricant.

In order that the invention may readily be carried into effect a few embodiments of the bearing according to the invention will now be described in greater detail, by way of example, with reference to the accompanying drawings, in which FIG. 1 is a cross-sectional view of a bearing according to the invention;

Figure 1:
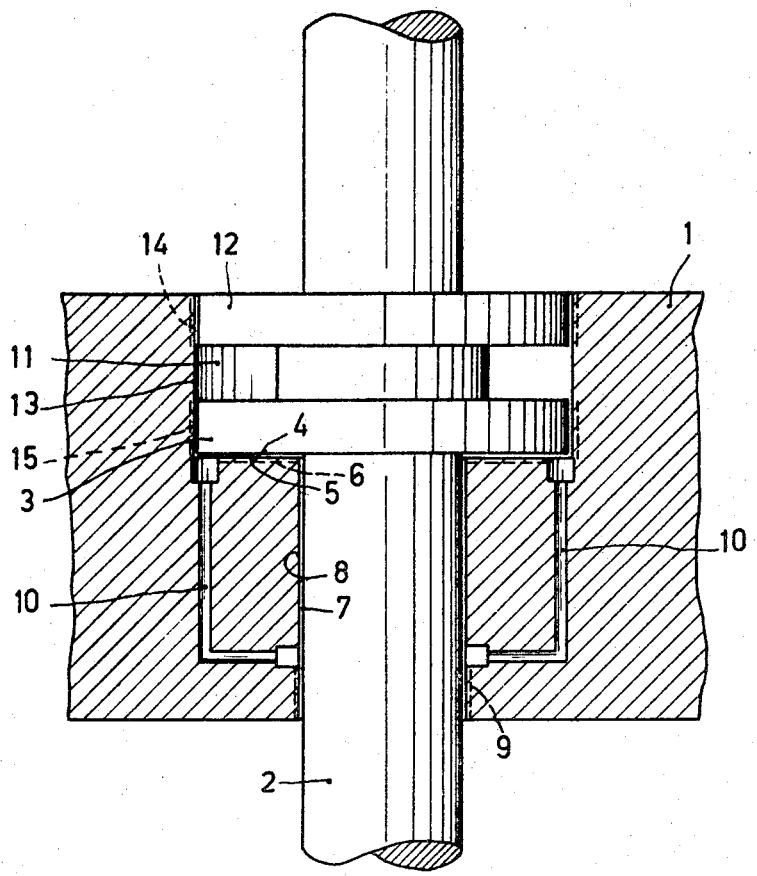

The bearing shown in FIG. 1 comprises a stationary bearing member 1 and a rotatable bearing member which is constituted by a shaft 2 which is driven in one direction of rotation. The shaft 2 has a ridge 3 the surface 4 of which forms a supporting surface for receiving axial forces. A supporting surface 5 in the stationary bearing member cooperates with the supporting surface 4. In this supporting surface 5 a pattern of regularly distributed, very shallow spiral grooves 6 are provided which, on rotation of the shaft, try to urge a lubricant in the direction of the centre line of the shaft 2. The shaft 2 further comprises a cylindrical supporting surface 7 which cooperates with a supporting surface 8 in the stationary bearing member. The supporting surfaces 7 and 8 serve for receiving radial load. In the stationary bearing member 1 helical grooves 9 are provided near the end of the supporting surfaces which grooves have a pumping effect in the direction of the spiral grooves when the shaft is rotated. The compression side of the helical grooves 9 and the entrance side of the spiral groove pattern 6 communicate through ducts 10. A storage space 11 for lubricant is provided between a ridge 3 and a second ridge 12 on the shaft 2. The storage space is closed by a wall 13 of the stationary bearing member 1. Two sets of helical grooves 14, 15 which both have a pumping effect in the direction of the spiral groove pattern when the shaft 2 is rotated, are arranged in the wall 13. The grooves 14 serve as a seal to prevent loss of lubricant to the exterior.

The ducts 10 and the storage space 11 are filled with lubricant, for example, grease. When the shaft 2 is rotated the lubricant is urged by the spiral grooves 6 into the bearing gap between the supporting surfaces 4 and 5 and then into the bearing gap between the supporting surfaces 7 and 8. The lubricant is returned again to the entrance side of the spiral grooves 6 through the duct 10. The helical grooves 9 together with the rotating shaft constitute a seal for the lubricant.

The bearing can receive both axial and radial forces and has a hydrodynamic operation so that frictional losses are minimized. In the case of high numbers of revolution of the shaft 2 it may occur that, as a result of the centrifugal effect, insufficient lubricant reaches the operating region of the entrance side of the spiral groove pattern and that thus the favourable hydrodynamic lubricating effect is disturbed. Also the loss of some lubricant makes the operation less favourable. The lubricant in the storage space 11, however, is urged in the direction of the wall 13 of the stationary bearing member 1 as a result of the centrifugal force when the shaft 2 is rotated. The transport grooves 15 transport the lubricant, which is forced against the wall 13 as a result of the centrifugal force, to the entrance side of the spiral grooves 6 keeping the closed lubricating system under pressure so that this is always entirely filled with lubricant. The transporting effect of the grooves 15 only occurs when lubricant has been lost.

Although all the grooves in the embodiment shown in FIG. 1 are provided in the stationary bearing member, alternatively all the grooves, or a few grooves, may be provided in the rotatable bearing member by which the operation of the bearing is not influenced. A great variety of lubricants may be used but the bearing has a very favourable effect in particular when grease is used as a lubricant.

Figure 2:
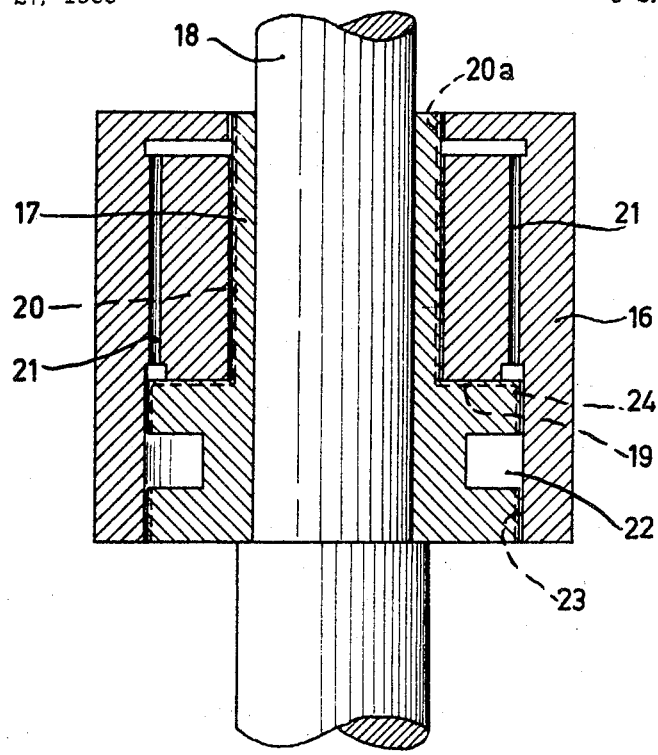
FIG. 2 is a cross-sectional view of a further embodiment.

FIG. 2 shows a bearing which is constructed as a separate unit and to which the external dimensions of a ball bearing may be given. The rotatable bearing member in this embodiment consists of a sleeve 17 which is secured to a shaft 18. The sleeve 17 comprises a spiral groove pattern 19 and a helical groove pattern 20 of the closed lubricating system. The urging effect of the groove pattern 19 when the shaft is rotated, is directed to the centre line of the shaft; on rotation of the shaft the groove pattern 20 urges lubricant in the direction of the spiral groove pattern 19. As contrasted with the grooves 9 shown in FIG. 1 the grooves 20 in this embodiment are provided throughout the length of a supporting surface for receiving radial load. The part 20a of the grooves 20 serves as a seal for the lubricant to prevent leakage to the exterior. The entrance side for the lubricant in the spiral grooves 19 communicates with the helical groove pattern 20 through ducts 21 at the region where the grooves 20a begin. The stationary bearing member is constructed as an annular member 16. A storage space 22 for the lubricant is provided in a second portion of the sleeve 17. This portion also comprises pumping grooves 23 and 24. The groove 24 transports lubricant, if required, from a storage space 22 to the entrance side of the spiral grooves 19, as was already explained with reference to FIG. 1, and groove 23 serves as a seal. The use of the sleeve 17 has the advantage that the groove patterns can easily be provided.

The spiral groove pattern 19 and the helical groove pattern 20 have a urging effect which is directed towards one another. The direction in which the lubricant circulates through the closed lubricating system is determined by that groove pattern which has the greatest urging effect. The axial forces are best received if the urging effect of the helical grooves 20 is somewhat larger than the urging effect of the spiral groove pattern 19. To obtain a ratio, which is most favourable for a given load case, between the radial and axial forces to be received, for example in a given spiral groove pattern a pitch may be given to the helical grooves 20 which is suitable for that load case. The transport grooves 24 ensure that lubricant, if any, from the space 22 is added to the closed lubricating system so that this is always filled entirely with lubricant.

Figure 3:
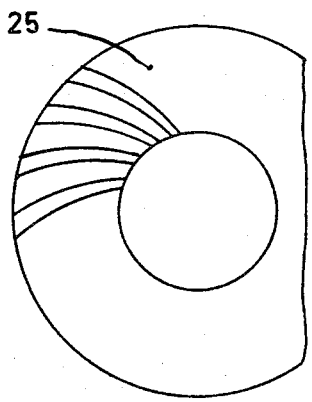
FIGS. 3 and 4 are an elevation and a cross-sectional view respectively of a foil with spiral grooves which is preferably used.
Figure 4:
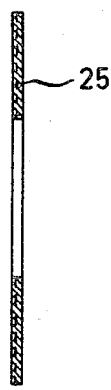

The spiral grooves are preferably provided by means of an etching process in a metal foil 25 which is shown in FIGS. 3 and 4. The metal foil is secured with its non-grooved side to one of the two supporting surfaces for receiving the axial load, for example, on the supporting surface 5 shown in FIG. 1. The use of the metal foil has the advantage of a simple manufacturing method which is suitable for the spiral groove bearing to be mass-produced.

Figure 5:
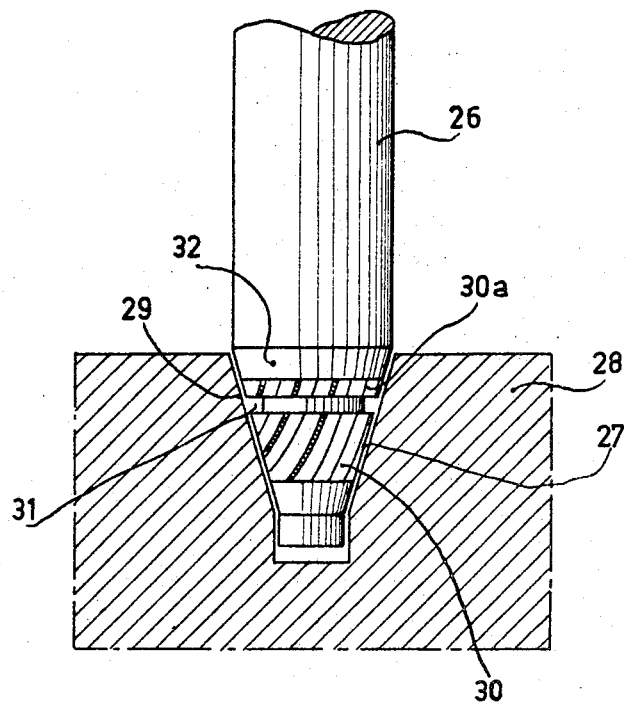
FIG. 5 shows an embodiment of a conical bearing according to the invention.

In FIG. 5 the invention is applied to a conical bearing. A shaft 26 comprises a conical supporting surface 27. A stationary bearing member 28 comprises a bore 29 which extends conically for the greater part, the bottom of the bore 29 being closed. In the conical part of the supporting surface 27 a spiral groove pattern 30 is provided which extends on either side of a storage space 31 for the lubricant. The portion 30a of the spiral grooves has only a small height and on rotation of the shaft 26 serves as a seal for lubricant to the exterior. The non-grooved portion 32 further serves as an additional seal when the shaft is stationary. The conical part of the shaft 26 in fact is forced on the shaft in the conical bore as a result of a slight axial pretension thus giving a ready seal in particular when grease is used as a lubricant.

When the shaft is rotated lubricant will be forced in the direction of the wall of the bore 29 as a result of the centrifugal force. The spiral grooves 30 urge this medium into the bearing gap resulting in a hydrodynamic effect of the bearing. When the whole bearing gap and also the bottom of the bore 29 are filled with lubricant the bearing remains operating hydrodynamically. Since in particular when grease is used no leakage to the exterior occurs and supply of lubricant to the bearing gap is always ensured as a result of the favourable position of the storage space, this bearing can remain in operation without replenishing with lubricant for an extremely long period of time.

What is claimed is:

1. A hydrodynamic bearing comprising a rotatable and a stationary bearing member, one of the cooperating supporting surfaces of the bearing being provided with a spiral groove pattern of small depth which, on rotation of the rotatable bearing member, urges the lubricant from the entrance side to the exit side of the bearing gap, characterized in that the rotatable bearing member comprises a storage space for the lubricant, said storage space being bounded by a wall of the stationary bearing member, transport grooves for the lubricant being provided in one of the surfaces of the stationary and the rotatable bearing member facing one another on the side of the storage space facing the cooperating supporting surfaces of the bearing, said grooves having a transporting effect in the direction of the cooperating supporting surfaces and debouching in the proximity of the entrance side of the spiral groove pattern.

2. A hydrodynamic sliding bearing as claimed in claim 1 for a continuous shaft in which the rotatable and the stationary bearing member each comprise first supporting surfaces located at right angles to the centre line of the shaft and cooperating with one another for receiving axial forces and each comprising second supporting surfaces cooperating with one another and adjoining the first supporting surfaces for receiving radial forces, characterized in that one of the cooperating first supporting surfaces is provided with a spiral groove pattern of small depth which has an urging effect in the direction of the centre line of the shaft and one of the cooperating second supporting surfaces comprises, at least at the end remote from the first supporting surface, a helical groove pattern which has an urging effect in the direction of the spiral groove pattern, the entrance side of the spiral groove pattern communicating with a place located near the end of the second supporting surfaces through at least one duct which is arranged in the stationary bearing member, the transport grooves being arranged in one of the cooperating supporting surfaces on one side of the storage space which is provided in the rotatable bearing member, a helical groove pattern being arranged on the other side and serving as a seal for the lubricant to the exterior.

3. A hydrodynamic sliding bearing as claimed in claim 2 in which the rotatable bearing member is integral with the shaft, characterized in that the storage space for the lubricant is provided between two ridges at right angles to the shaft, one of the two supporting surfaces for receiving axial forces being formed by the surface of one of the ridges remote from the storage space, the helical groove patterns for transporting and sealing the medium being each arranged in one of the surfaces of the ridges facing one another and the stationary bearing member.

4. A hydrodynamic sliding bearing as claimed in claim 2 characterized in that the rotatable bearing member consists of a sleeve having an upright wall which can be secured to a shaft and the stationary bearing member consists of an annular member the inner surface of which corresponds to the outer surface of the sleeve, the groove patterns being provided in the surface of the sleeve and the storage space for lubricant being located in the upright wall of the sleeve.

5. A hydrodynamic sliding bearing as claimed in claim 2 characterized in that the spiral groove pattern is provided in a foil by means of an etching process, said foil being secured with its ungrooved side to one of the two supporting surfaces for receiving the axial load.

6. A hydrodynamic sliding bearing as claimed in claim 1 in which the rotatable bearing member is secured to a shaft and has a conical supporting surface which, at least over part of its length, is provided with a spiral groove pattern, in the stationary bearing member comprising a bore with a conical supporting surface and closed at the bottom, characterized in that the storage space for lubricant is provided in the conical rotatable bearing member and the spiral groove pattern extends on either side of the storage space, the part of the spiral groove pattern facing the shaft and serving as a seal having only a small length, a non-grooved conical part being arranged in the cooperating supporting surfaces between the shaft and the part of the spiral groove pattern serving as a seal.

References Cited

FOREIGN PATENTS 10,615    5/1880    Germany.

EDGAR W. GEOGHEGAN, *Primary Examiner.*

FRANK SUSKO, *Assistant Examiner.*